United States Patent

Kayano et al.

[11] Patent Number: 5,968,100
[45] Date of Patent: Oct. 19, 1999

[54] VEHICLE CONTROL METHOD AND SYSTEM THEREFOR

[75] Inventors: Mitsuo Kayano; Hiroshi Katayama, both of Hitachi; Mitsuru Watabe, Urizura-machi, all of Japan; Junichi Ishii, Novi, Mich.; Tetsuya Ichihashi; Shoji Sasaki, both of Hitachinaka, Japan

[73] Assignees: Hitachi, Ltd., Tokyo; Hitachi Automotive Engineering Co., Ltd., Hitachinaka, both of Japan

[21] Appl. No.: 08/958,135

[22] Filed: Oct. 28, 1997

Related U.S. Application Data

[63] Continuation of application No. 08/500,056, Jul. 10, 1995, abandoned.

[30] Foreign Application Priority Data

Jul. 8, 1994 [JP] Japan .................................. 6-156992

[51] Int. Cl.⁶ .................................................. G06F 19/00
[52] U.S. Cl. .................................................. 701/1; 701/36
[58] Field of Search .................................. 364/1, 36, 70, 364/99, 102, 115; 123/486, 488, 492, 494

[56] References Cited

U.S. PATENT DOCUMENTS

| | | | |
|---|---|---|---|
| 4,034,721 | 7/1977 | Lenzi et al. | 123/494 |
| 4,212,063 | 7/1980 | Härdmark | 701/70 |
| 4,677,557 | 6/1987 | Stumpe | 701/70 |
| 5,048,495 | 9/1991 | Onari et al. | 123/492 |
| 5,490,064 | 2/1996 | Minowa et al. | 701/1 |

*Primary Examiner*—Gary Chin
*Attorney, Agent, or Firm*—Antonelli, Terry, Stout & Kraus, LLP

[57] ABSTRACT

A vehicle control system provided with a plurality of sensors for detecting the condition of the vehicle, a vehicle control unit including a multiplexer, a programmable input signal matching module and a processor, and actuators for operating each part of the vehicle. The multiplexer and matching module are selected and switched in accordance with a sensor signal to be inputted. A plurality of sensor signals can be inputted through the switched multiplexer and matching module to the processor. Furthermore, the processor determines controls of vehicle operation on the basis of the inputted sensor signals and controls actuators in accordance with the determined controls.

14 Claims, 12 Drawing Sheets

VEHICLE CONTROL METHOD AND SYSTEM THEREFOR

This is a continuation of application Ser. No. 08/500,056, filed Jul. 10, 1995, now abandoned.

BACKGROUND OF THE INVENTION

The present invention relates to a vehicle control system on board a vehicle, and more particularly, to an improved vehicle control system provided with a processor for controlling actuators, which inputs a sensor signal from a variety of sensors mounted on the vehicle through the matching circuit switched in accordance with the sensor signal to be inputted.

In the conventional vehicle control system, a variety of sensor signals, for example, pulse signals of a crank sensor and a vehicle speed sensor, on/off signals of a ignition switch and a neutral switch, and analog signals of an air flow sensor and a water temperature sensor, are matched by a matching circuit constructed by the dedicated discrete parts. If the number of input signals is increased to improve the function of the vehicle control system, the number of matching circuits is also increased. This causes a number of problems in the prior art structures. For example, it is difficult to find a point to mount the vehicle control unit. Also, the number of manhours needed to assemble the unit is increased because the use of many discrete parts requires much time to assemble. It also requires much time to develop the control unit, because it must be designed individually for the matching circuits.

SUMMARY OF THE INVENTION

An object of the present invention is to provide an improved vehicle control method and system thereof, in which a processor is connected to a plurality of sensors through a multiplexer and a matching circuit, and the multiplexer and the matching circuit are switched by using software.

According to one aspect of the present invention, because one matching circuit can be switched by software in accordance with a sensor signal to be inputted, it is possible to make a vehicle control unit small. According to another aspect of the present invention, by making an LSI of the matching circuit, it is possible to reduce the number of manhours needed to assemble the vehicle control unit.

DESCRIPTION OF THE PREFERRED EMBODIMENTS

Figure 1:
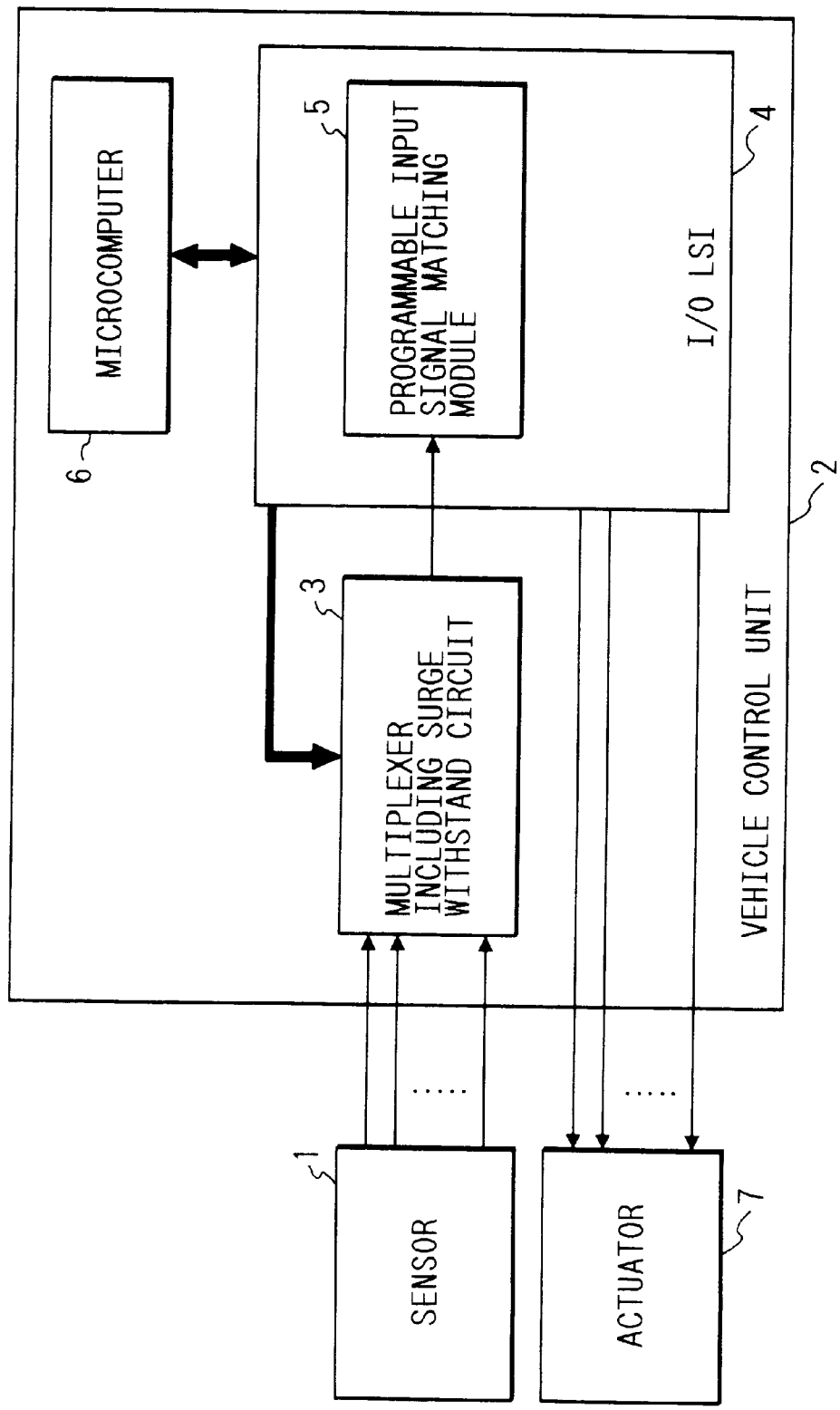
FIG. 1 is a block diagram showing an embodiment of vehicle control equipment provided with a vehicle control unit 2.
Figure 2:
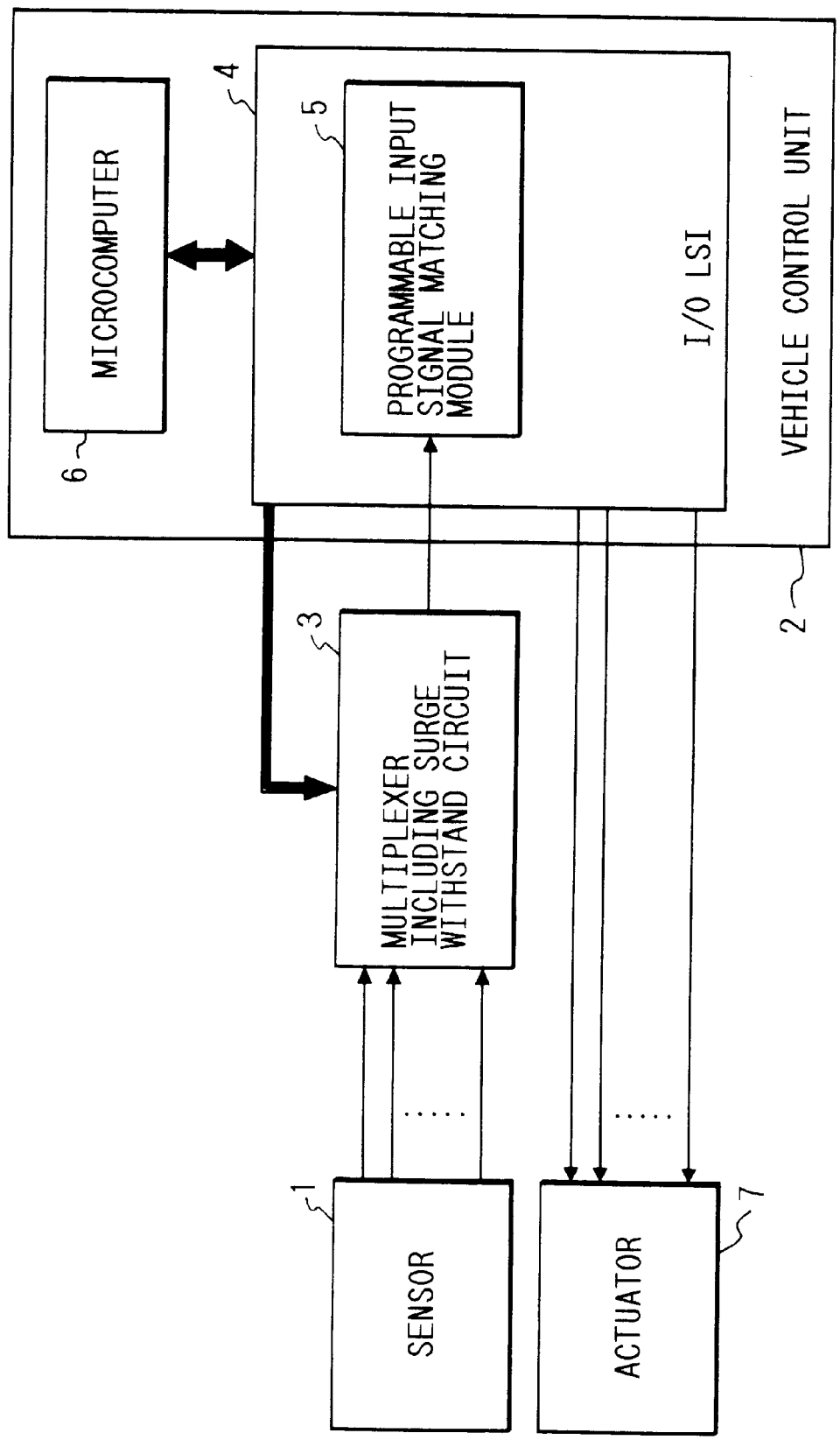
FIG. 2 is a block diagram showing another embodiment of the vehicle control equipment, in which the multiplexer 3 including the surge withstand circuit is arranged outside of the vehicle control unit 2.
Figure 3:
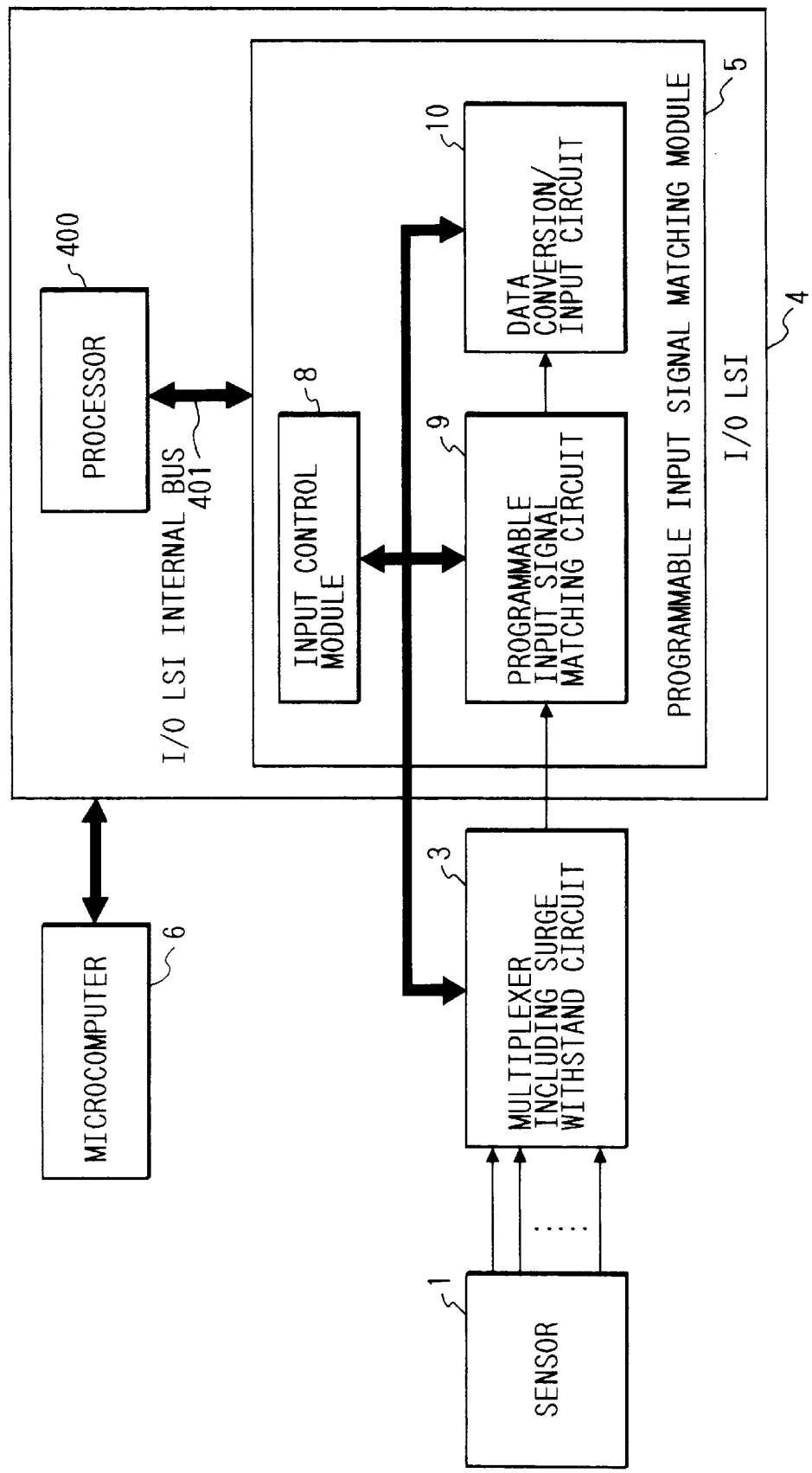
FIG. 3 is a partially detailed diagram of a sensor signal input part of the vehicle control equipment of the present invention.
Figure 4:
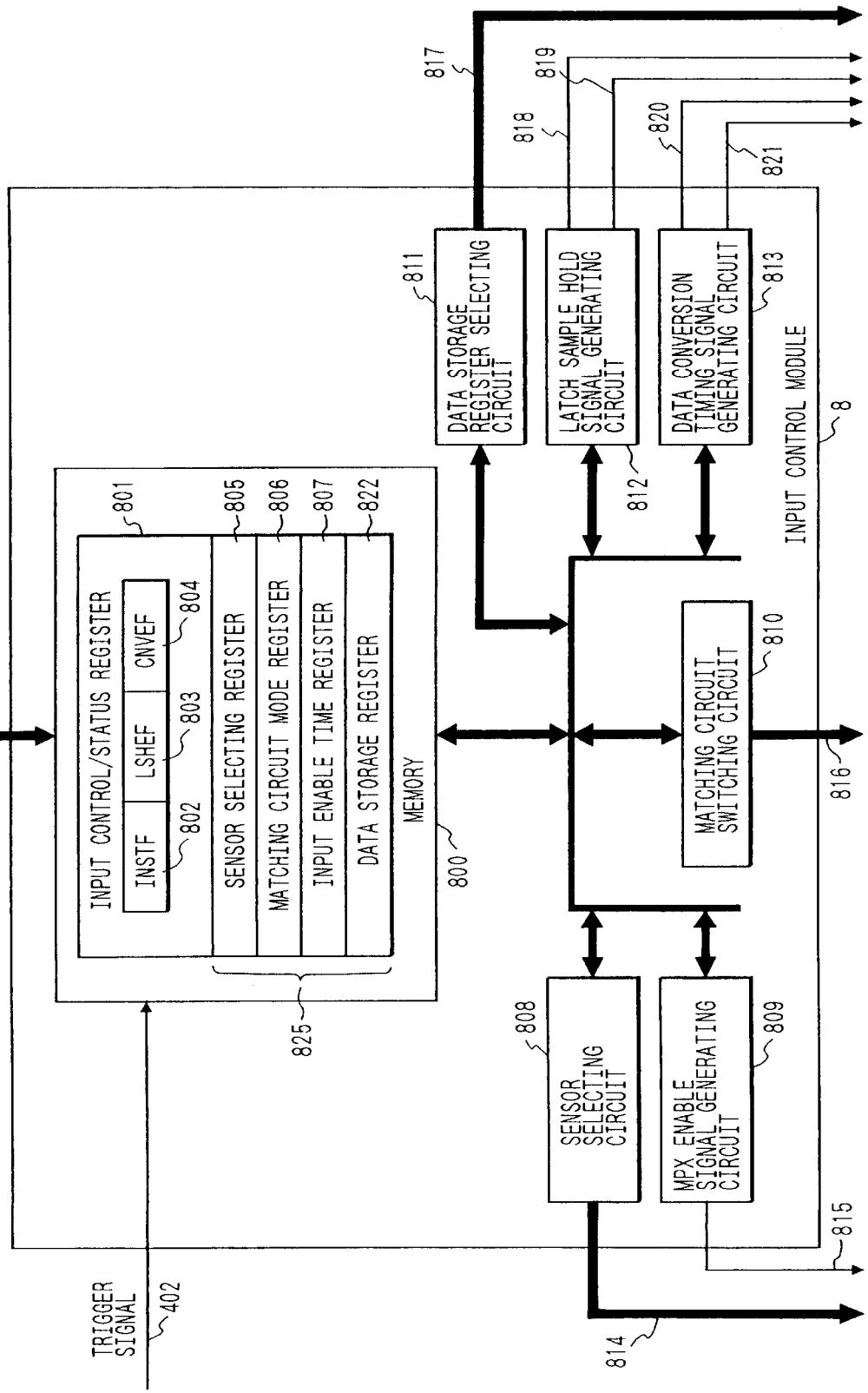
FIG. 4 is a block diagram of an embodiment of an input control module 8 shown in FIG. 3.
Figure 5:
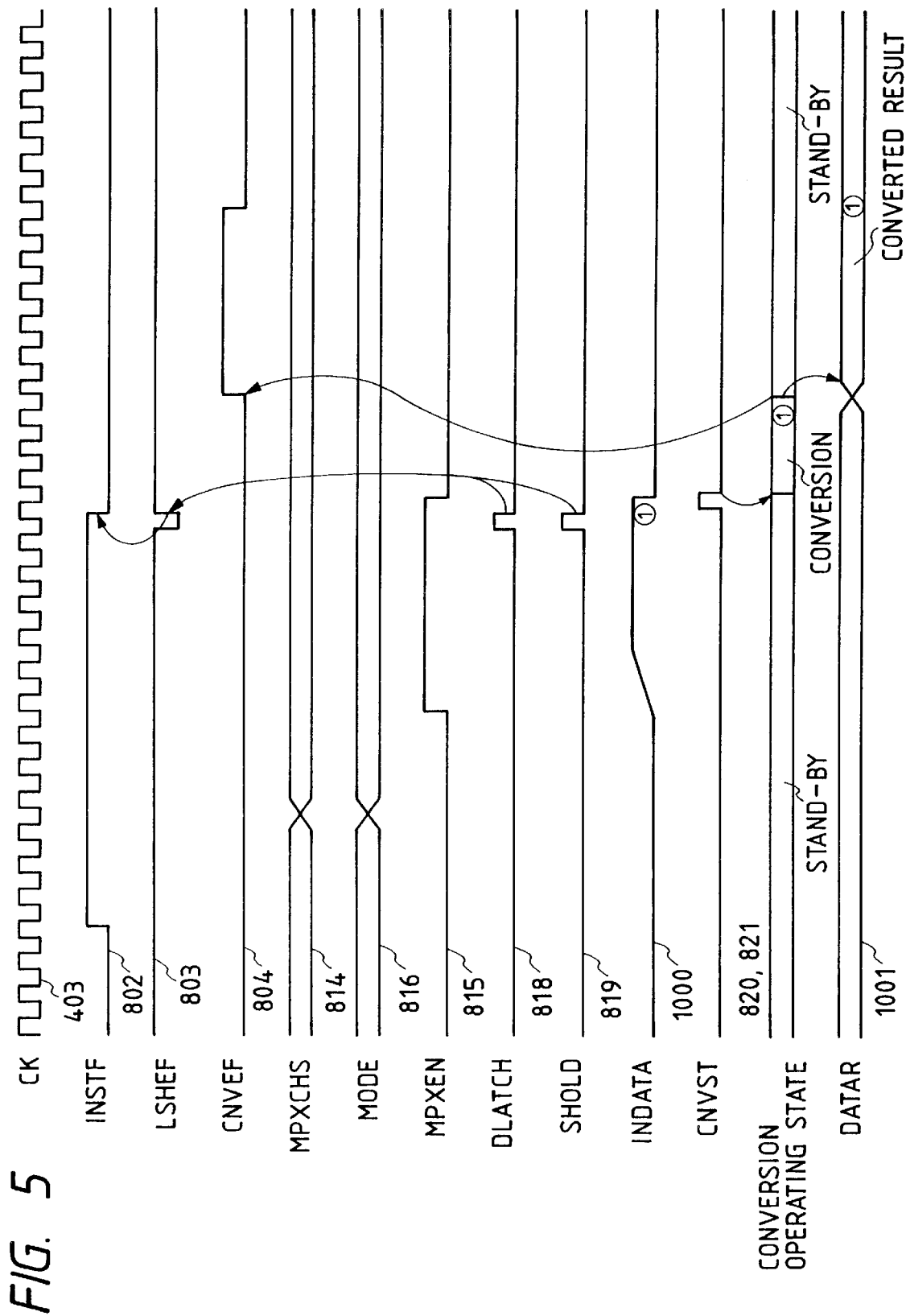
FIG. 5 is a timing chart for illustrating the operation of each part of the input control module 8.
Figure 6:
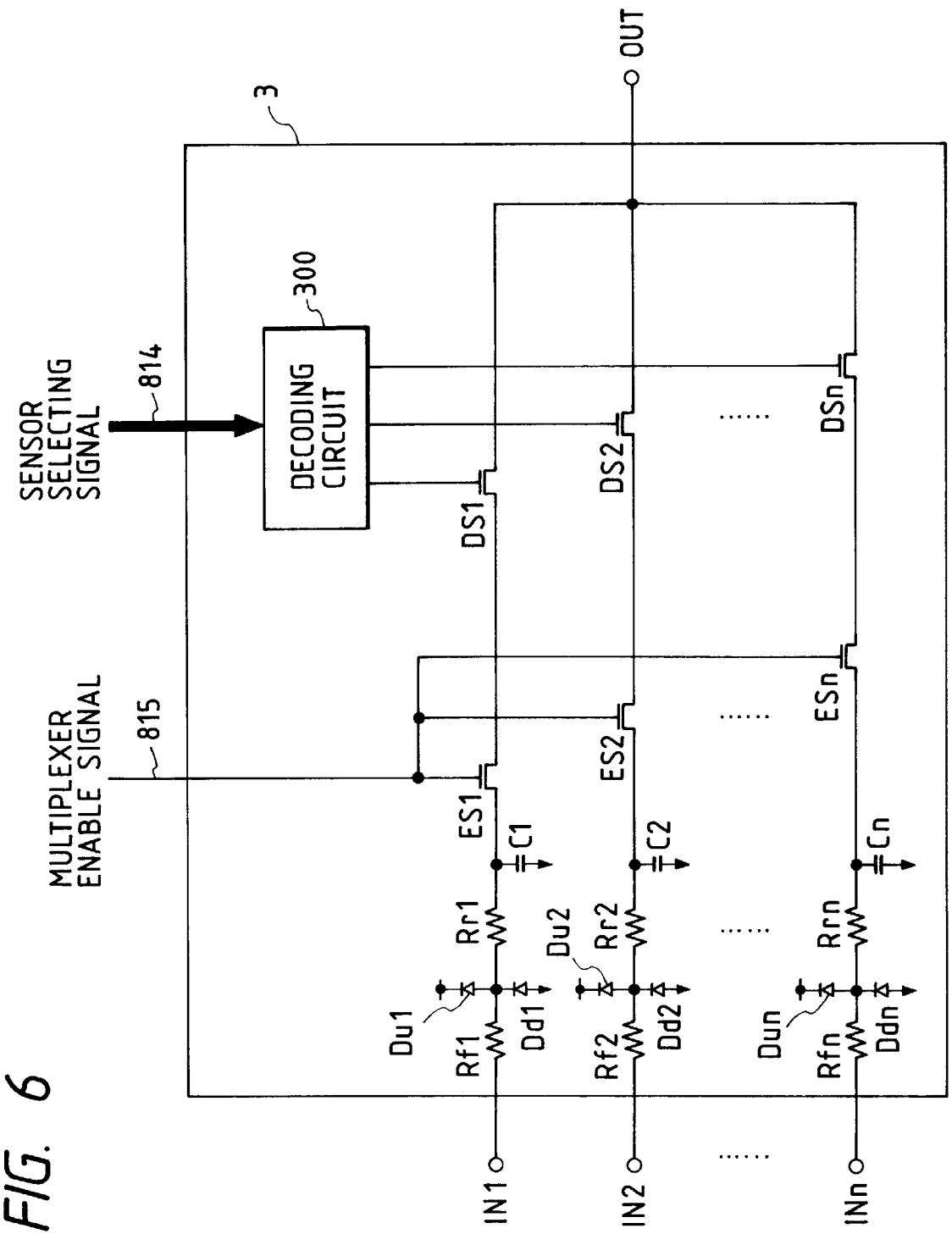
FIG. 6 is a cicuit diagram showing an embodiment of the multiplexer 3 including the surge withstand circuit, shown in FIG. 1.
Figure 7:
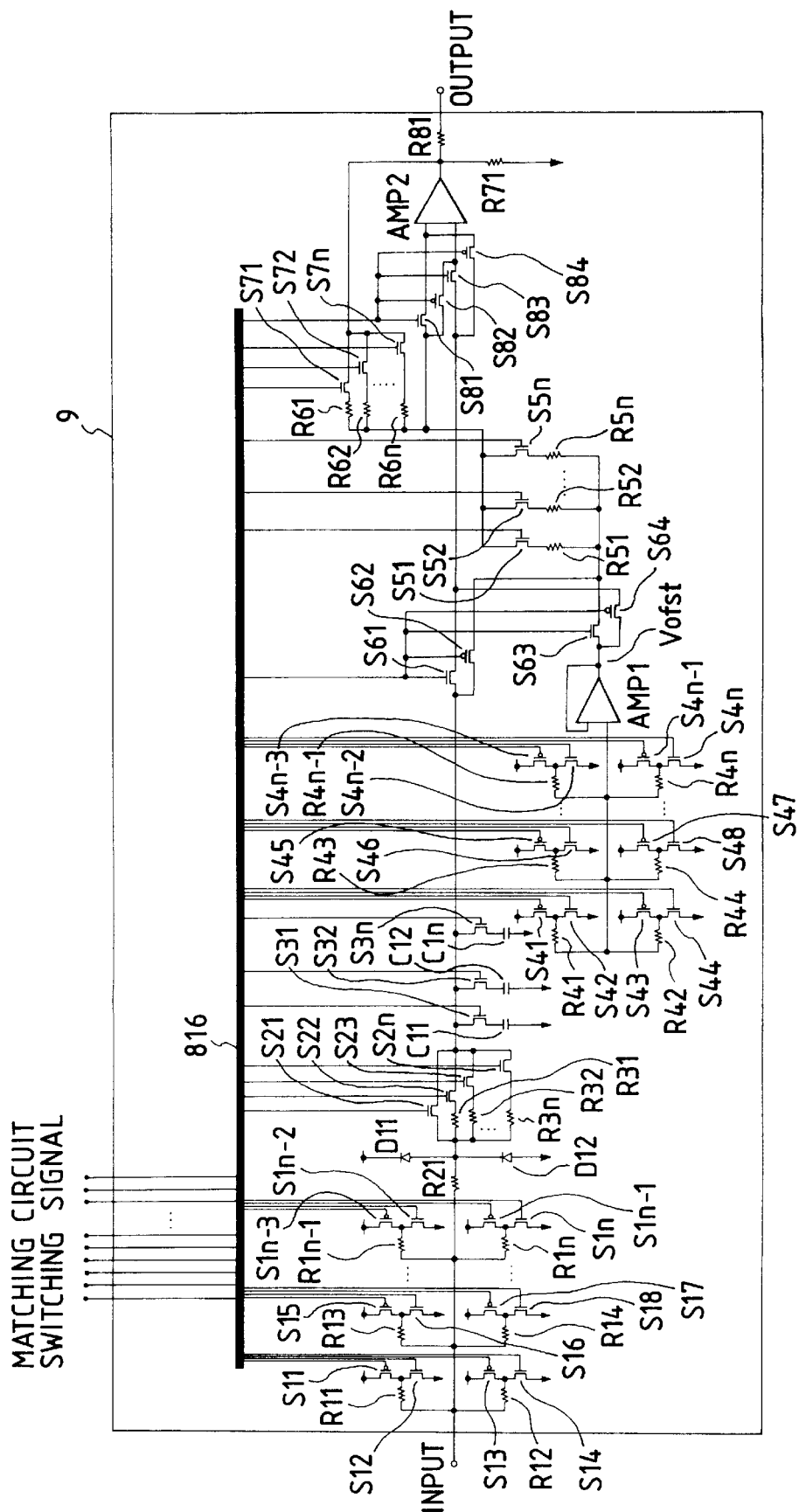
FIG. 7 is a circuit diagram showing an embodiment of a programmable input signal matching module 5.
Figure 8:
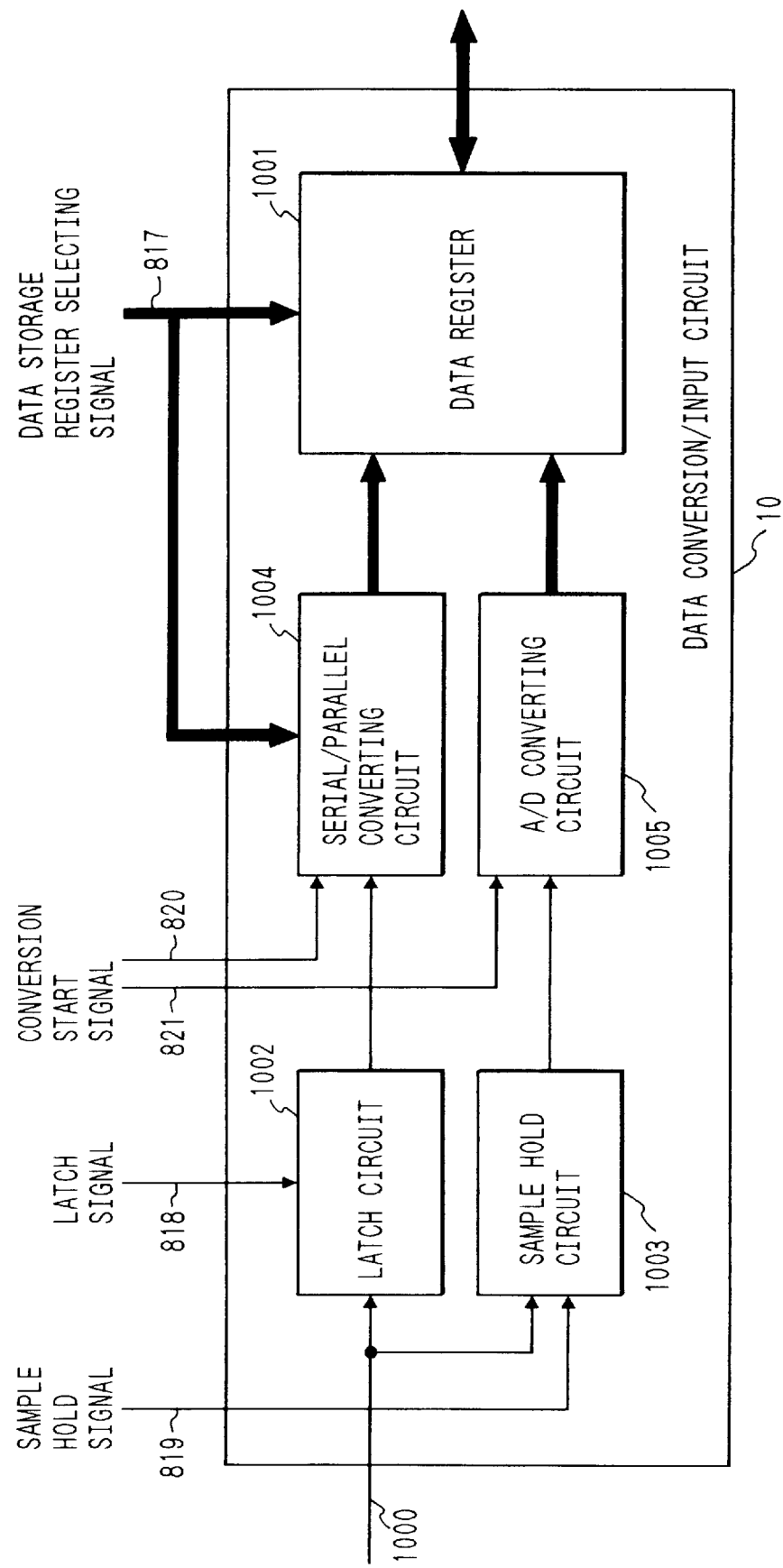
FIG. 8 is a block diagram showing an embodiment of a data conversion/input circuit 10 shown in FIG. 3.
Figure 9:
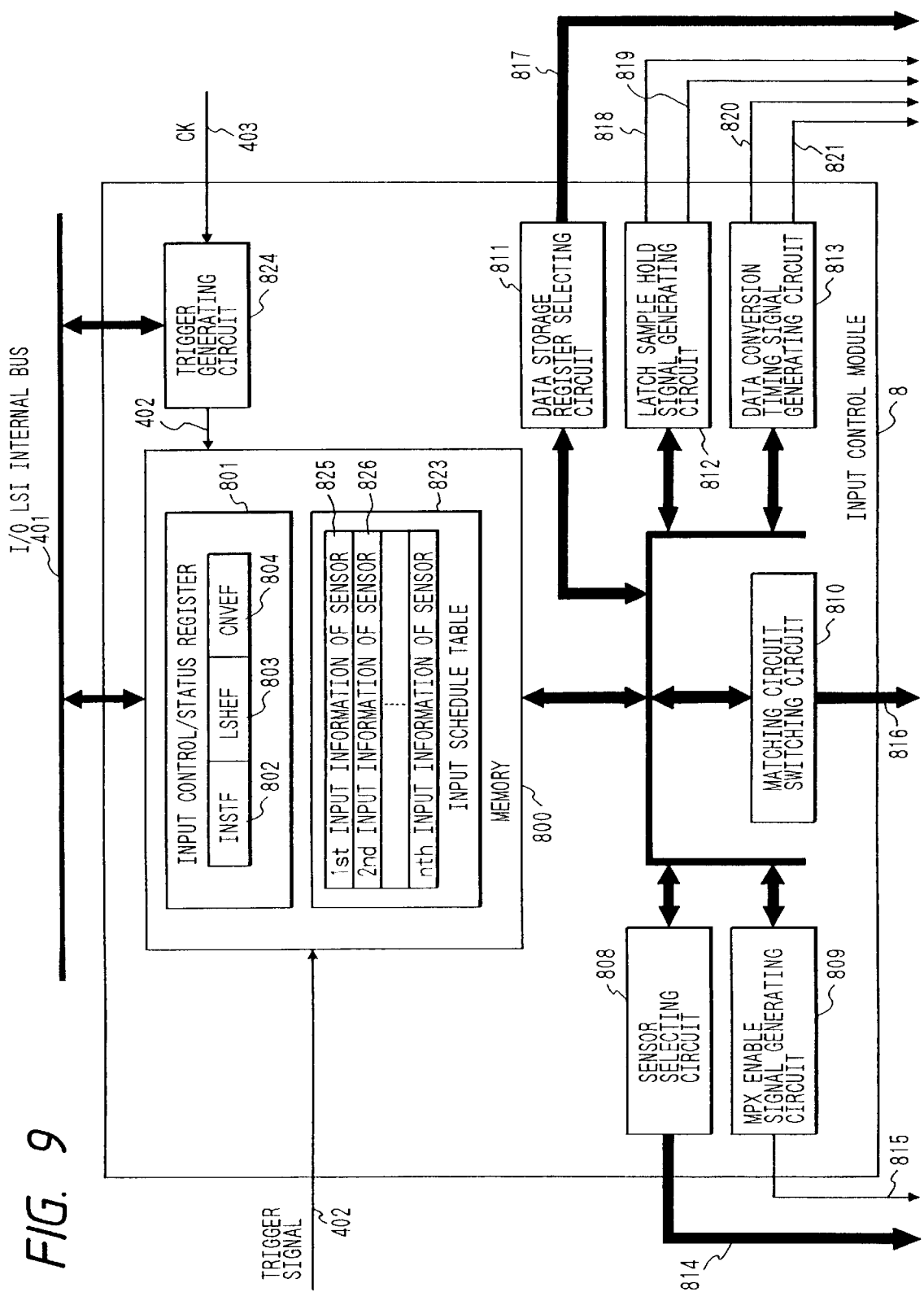
FIG. 9 is a block diagram showing another embodiment of the input control module 8, in which an input schedule table is used.
Figure 10:
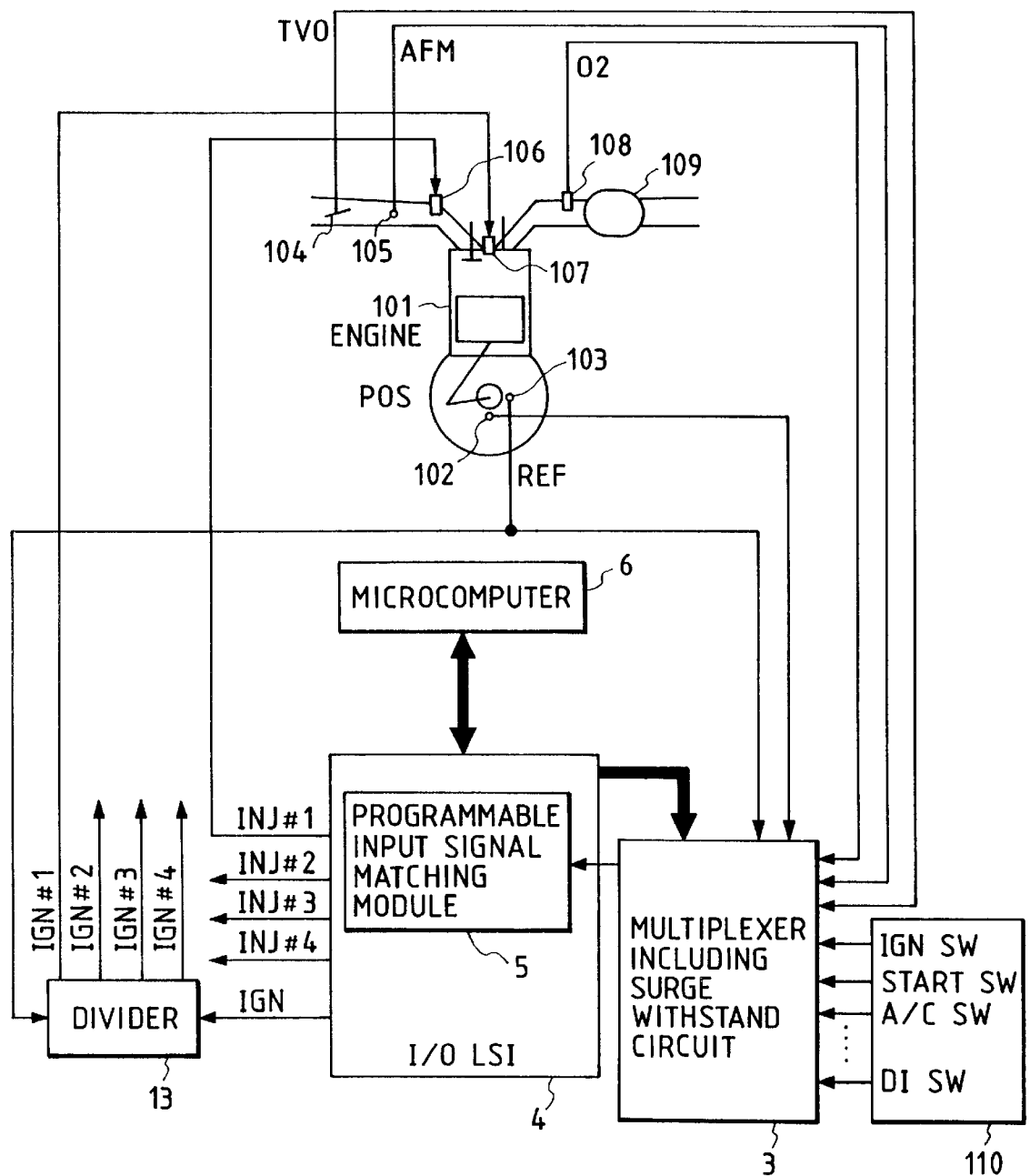
FIG. 10 is an block diagram of a vehicle engine control system using the vehicle control unit 2 of the present invention.
Figure 11:
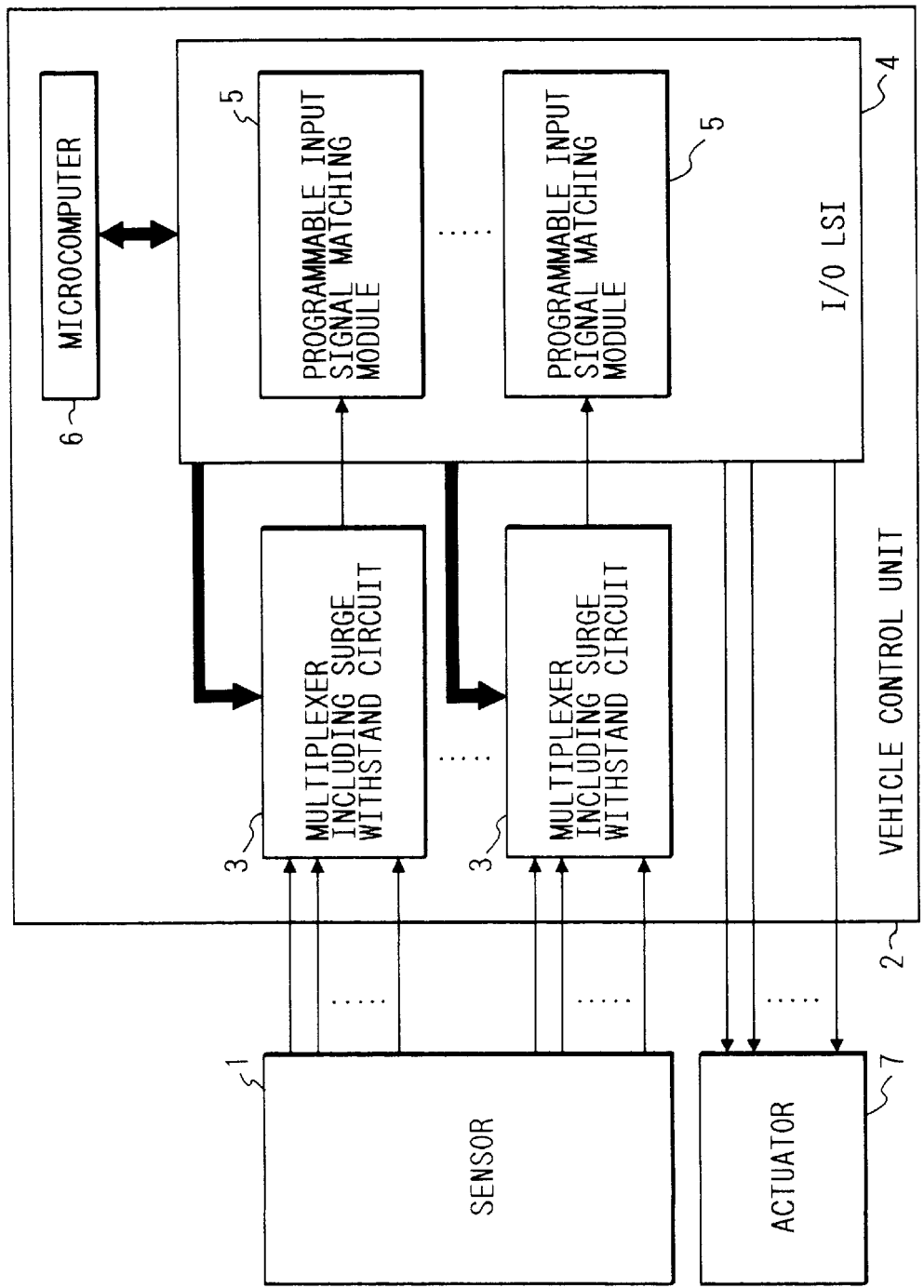
FIG. 11 is a block diagram similar to that of FIG. 1, in which the I/O LSI 4 includes a plurality of programmable input signal matching modules 5.
Figure 12:
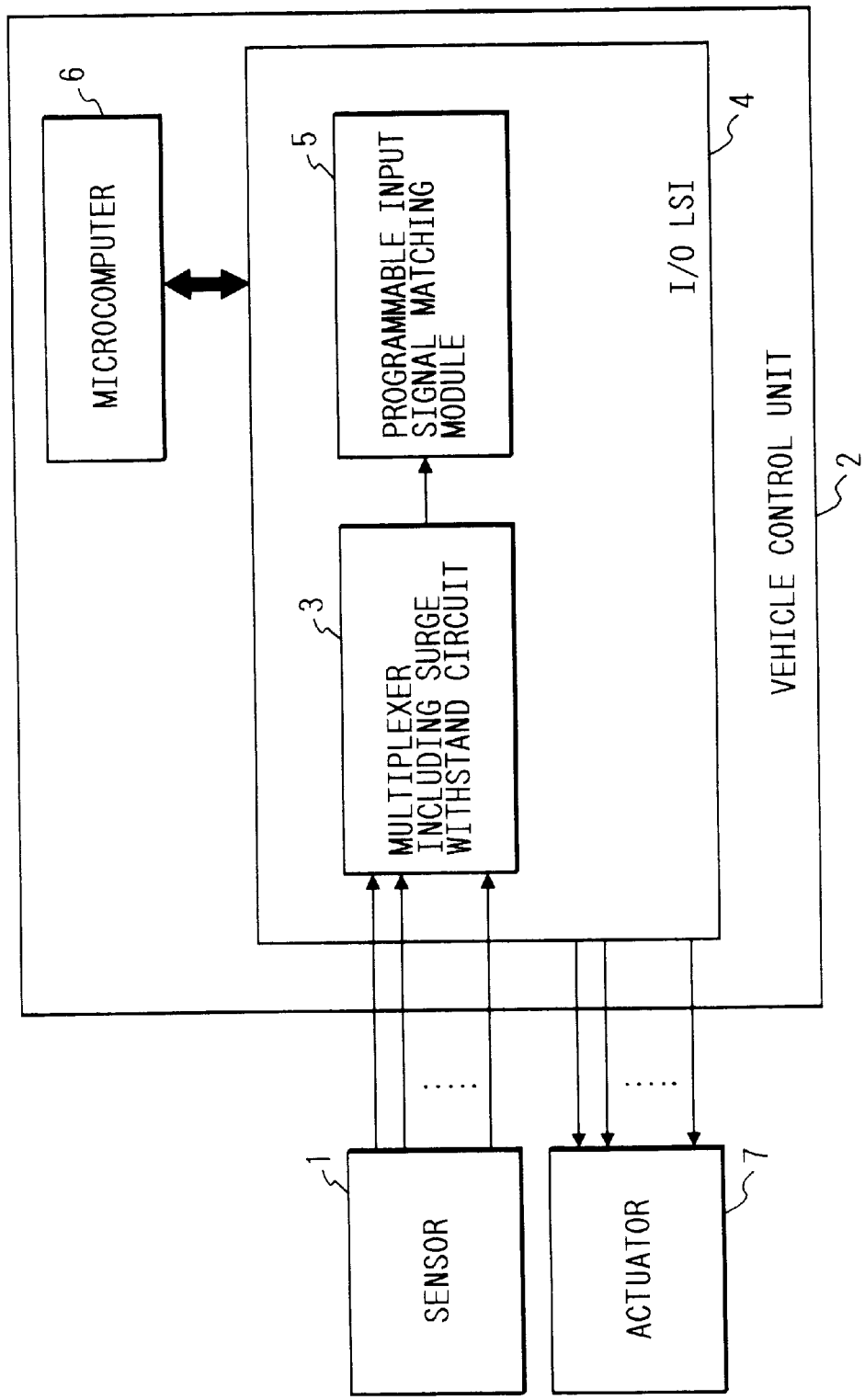
FIG. 12 is a block diagram showing another embodiment of the vehicle control unit 2, which has the I/O LSI 4 provided with both the multiplexer 3 including the surge withstand circuit and the programmable input signal matching module 5.

Hereinafter, an embodiment of the present invention will be explained in detail. FIG. 1 is a block diagram showing an embodiment of vehicle control equipment provided with a vehicle control unit 2. It has a multiplexer 3 including a surge withstand circuit, an I/O LSI 4 including a programmable input signal matching module 5, and a microcomputer 6. FIG. 2 is a block diagram showing another embodiment of the vehicle control equipment, in which the multiplexer 3 including the surge withstand circuit is arranged outside of the vehicle control unit 2 provided with the I/O LSI 4 including the programmable input signal matching module 5 and the microcomputer 6. FIG. 3 is a partially detailed diagram of the vehicle control equipment of the present invention. FIG. 4 is a block diagram of an embodiment of an input control module 8 shown in FIG. 3. FIG. 5 is a timing chart for illustrating the operation of each part of the input control module 8. FIG. 6 is a circuit diagram showing an embodiment of the multiplexer 3 including the surge withstand circuit. FIG. 7 is a circuit diagram showing an embodiment of the programmable input signal matching module 5. FIG. 8 is a block diagram showing an embodiment of a data conversion/input circuit 10 shown in FIG. 3. FIG. 9 is a block diagram showing another embodiment of the input control module 8, in which an input schedule table is used. FIG. 10 is an block diagram of a vehicle engine control system using the vehicle control unit 2 of the present invention. FIG. 11 is a block diagram similar to that of FIG. 1, in which the I/0 LSI 4 includes a plurality of programmable input signal matching modules 5. FIG. 12 is a block diagram showing another embodiment of the vehicle control unit 2, which has the I/O LSI 4 provided with both the multiplexer 3 including the surge withstand circuit and the programmable input signal matching module 5.

Referring now to FIG. 1, an embodiment of the vehicle control equipment according to the present invention will be explained. Sensor signals indicative of the condition of a vehicle from sensors 1 are inputted to the multiplexer 3 including the surge withstand circuit within the vehicle control unit 2. The sensor signals can include a vehicle speed signal, a throttle opening signal, a crank angle signal, and a gear position signal. A signal selected by the multiplexer 3 is inputted to the programmable input signal matching module 5 including the I/O LSI 4. The selected input signal is matched in the matching module 5. A microcomputer 6 connected to the I/O LSI 4 determines the content of controls on the basis of at least one matched signal data, and controls an actuator 7 for operations such as an injection, an ignition, a shift solenoid, a lock-up solenoid, a brake, etc. The sensor signals inputted to the multiplexer 3 are selected by using an output signal from the I/O LSI 4, and the programmable input signal matching circuit in the programmable input signal matching module 5 is also switched in syncronization with the switching timing of the selection. Thereby, a plurality of sensor signals can be inputted to the multiplexer 3 including the surge withstand circuit and then the programmable input signal matching module 5. It is, therefore, possible to make the vehicle control unit 2 small, and to reduce the assembly time, the development time and the cost. The number of the sensor signals is around 100 in an engine control or a transmission control. It is possible to provide a plurality of 8-input, 16-input or 32-input multiplexers. The same number of programmable input signal matching modules as the multiplexers 3 may be used. Further, without providing the multiplexer 3 including the surge withstand circuit, the I/O LSI 4 including the programmable input signal matching module 5 may be provided to each of sensors 1 instead.

Referring to FIG. 2, another embodiment of the vehicle control equipment according to the present invention will be explained next. Sensor signals indicative of the condition of a vehicle from sensors 1 are inputted to the multiplexer 3 including the surge withstand circuit outside of the vehicle control unit 2. The sensor signals can include, for example, a vehicle speed signal, a throttle opening signal, a crank angle signal, or a gear position signal. A signal selected by the multiplexer 3 is inputted to the programmable input signal matching module 5 including the I/O LSI 4. The selected input signal is matched in the matching module 5. A microcomputer 6 connected to the I/O LSI 4 determines the content of controls on the basis of at least one matched signal data, and controls an actuator 7 for operations such as an injection, an ignition, a shift solenoid, a lock-up solenoid, a brake, etc. The sensor signals inputted to the multiplexer 3 are selected by using an output signal from the I/O LSI 4, and the programmable input signal matching circuit in the programmable input signal matching module 5 is also switched in syncronization with the switching timing of the selection. Thereby, a plurality of sensor signals can be inputted to the multiplexer 3 including the surge withstand circuit and then the programmable input signal matching module 5. It is, therefore, possible to make the vehicle control unit 2 small, and to reduce the assembly time, the development time and the cost. Further, by placing the multiplexer 3 including the surge withstand circuit such as on a junction part of a harness side the vehicle control unit 2, the number of signal lines to the vehicle control unit 2 can be reduced to one. Therefore, because the number of connector pins can be reduced and the number of harnesses can be also done, it is possible to make the vehicle control unit 2 small, and to reduce the assembly time, the development time and the cost.

FIG. 3 is a partially detailed diagram of a sensor signal input part of the vehicle control equipment of the present invention. Sensor signals indicative of the condition of a vehicle from sensors 1 are inputted to the multiplexer 3 including the surge withstand circuit outside of the vehicle control unit 2. These sensor signal is, for example, a vehicle speed signal, a throttle opening signal, a crank angle signal, or a gear position signal. In order to select a sensor signal of the data which the microcomputer 6 needs, connected to a processor 400 within the I/O LSI 4, an input control module 8 within the programmable input signal matching module 5 outputs a sensor selecting signal to the multiplexer 3 including the surge withstand circuit. In order to switch the programmable input signal matching circuit 9 to another matching circuit 9 corresponding to a newly selected sensor in synchronization with the above operation, the input control module 8 outputs a matching circuit switching signal to the programmable input signal matching circuit 9. When a data conversion/input circuit 10 receives the necessary data, the input control module 8 outputs a data input signal, and the data conversion/input circuit 10 converts and inputs the data input signal. The data inputted as described above is accessed through an I/O LSI internal bus 401 by the processor 400 within the I/O LSI 4 or the microcomputer 6 connected to the I/O LSI 4, and used to control the actuator.

FIG. 4 is a block diagram of an embodiment of an input control module 8 shown in FIG. 3. An input start flag INSTF802 stored in an input control/status register 801 of a memory 800 is set up by a software or a trigger signal 402. When the flag INSTF802 is set up, a sensor selecting circuit 808 outputs a sensor selecting signal 814 in order to select a sensor corresponding to the value stored in the sensor selecting register 805. Further, a matching circuit switching circuit 810 outputs a matching circuit switching signal on the basis of the value stored in a matching circuit mode register 806 corresponding to the value of the sensor selecting register 805, in order to select a sensor corresponding to the value of the sensor selecting register 805. If a sensor signal is inputted during the selection of sensors or the switch of matching circuits, there are some fears that a plurality of sensor signals will be inputted to one matching circuit and that a sensor signal will be inputted to a different matching circuit and the matching circuit is damaged as a result. Further, because the time during which the sensor signal is stable is different in each of the matching circuits, after a multiplexer and a matching circuit is switched completely, a MPX (multiplexer) enable signal generating circuit 809 outputs a multiplexer enable signal 815 just during the time stored in an input enable time register 807. After the sensor input signal becomes stable, a latch sample hold signal generating circuit 812 outputs a latch signal 818 if the sensor input signal is a digital signal, and a sample hold signal 819 if it is an analog signal. A latch sample hold end flag LSHEF803 is cleared during the latch or the sample hold, and it is set up after the latch or the sample hold completes. At the same time, the input start flag INSTF802 is cleared. After that, a data conversion timing signal generating circuit 813 outputs a serial/parallel conversion timing signal 820 or an A/D conversion timing signal 821 and starts the data conversion. After the completion of the conversion, a data storage register selecting circuit 811 generates a data storage register selecting signal 817 corresponding to a data storage register 822, and the converted data is stored in the selected register. It is noted that this data may be stored in the data register corresponding to the sensor selecting register 805. After the data is stored, the conversion end flag CNVEF804 is set up. Even if the conversion end flag CNVEF804 is not set up, the circuit is switched for the signal to be inputted next if the latch sample hold end flag LSHEF803 is set up. As it has been described above, the switching of circuits and the conversion of data can be performed at the same time, and the necessary signals can be inputted quickly to the processor or the microcomputer.

FIG. 5 is a timing chart for illustrating the operation of each part of the input control module 8. The input start flag INSTF802 is set up by software or a trigger signal 402. When the start flag INSTFS02 is set up, the sensor selecting signal 814 and the matching circuit switching signal 816 are outputted. After the completion of switching of the multiplexer and the matching circuit, the multiplexer enable signal 815 is outputted. After the sensor signal 1000 becomes stable, a latch signal 818 or a sample hold signal 819 are outputted, The latch sample hold end flag LSHEF803 is cleared during the latch or the sample hold, and it is set up after the completion of the latch or the sample hold and, at the same time, the input start flag INSTF802 is cleared. After that, a serial/parallel conversion timing signal 820 or an A/D conversion timing signal 821 is outputted and the data conversion is started. After the completion of the conversion, the converted data is stored in the register selected by a data storage register selecting signal 817. It is noted that this data may be stored in the data register corresponding to the sensor selecting register 805. After the data is stored, the conversion end flag CNVEF804 is set up. Even if the conversion end flag CNVEF804 is not set up, the circuit is switched for the signal to be inputted next if the latch sample hold end flag LSHEF803 is set up. As it has been described above, the switching of circuits and the conversion of data can be performed at the same time, and the necessary signals can be inputted quickly to the processor or the microcomputer.

FIG. 6 is a cicuit diagram showing an embodiment of the multiplexer 3 including the surge withstand circuit, shown in FIG. 1. A surge withstand circuit comprising capacitors and diodes is provided at the back of each of a plurality of input terminals IN1, IN2,—INn. Resistors Rfl to Rfn operate to limit the amount of current flow, and diodes Du1 to Dun, Dd1 to Ddn operate to limit the direction of the current flow and eliminate a surge. The diodes Du1 to Dun are connected to an electric power source Vcc, and the diodes Dd1 to Ddn are connected to the ground GND. When a signal with the voltage higher than Vcc is inputted, a current flows to the diodes Du1 to Dun. As a result, the voltage higher than Vcc is not applied to the circuit of the post-stage. When a signal with the voltage lower than Vcc is inputted, a current flows to the diodes Dd1 to Ddn. As a result, the voltage lower than GND is not applied to the circuit of the post-stage. A low-pass filter comprising resistors Rr1 to Rrn and capacitances C1 to Cn operates to eliminate a high frequency surge and noise. The low-pass filter may be provided outside the pre-stage of the input terminal, without including in the multiplexer. Switches ES1 to ESn are ones for determining whether or not the multiplexer is connected to the surge circuit by the multiplexer enable signal 815. The switches prevent the damage of a matching circuit caused by the input of a plurality of sensors to one matching circuit during the switching of the multiplexer and the matching circuit, or the input of a sensor signal to a different matching circuit. An input signal is selected by decoding the sensor selecting signal 814 in a decode circuit 300 and turning on one of switches Ds1 to Dsn. It does not need the multiplexer enable signal 815 and the switches Es1 to Esn by adopting the following circuit construction. Namely, after turning off all of the switches Ds1 to Dsn for a constant time during the switching, one of the switches DS1 to DSn is turned on, and an input signal is selected without overlapping input signals.

FIG. 7 is a circuit diagram showing an embodiment of a programmable input signal matching module 5. Resistors R11 to R1n are for pull-up, pull-down and sensor-matching. In order to pull up by using the resistor R11, a binary digit "0" is inputted to the FET switches S11 and S12. Thereby the FET switch S11 is turned on and the FET switch S12 is turned off. The resistors R12 to R1n apply the matching circuit switching signal 816 which does not cause the pull-up or the pull-down to the FET switches S13 to S1n. In order to pull down by using the resistor R11, a binary digit "1" is inputted to the FET switches S11 and S12. Thereby the FET switch S11 is turned off and the FET switch S12 is turned on. The resistors R12 to R1n apply the matching circuit switching signal 816 which does not cause the pull-up or the pull-down to the FET switches S13 to S1n. The step of sensor matching includes averaging of the precision of measurement in the range of the measurement by making a non-linear sensor characteristic linear through the addition of a matching resistor. Therefore, various resistors become necessary. While the value of a resistor can be changed by connecting in parallel a plurality of resistors in this embodiment, it is possible to connect in series or connect in series and parallel. The reason why the pull-up switch has n-channel type FET and the pull-up switch has p-channel type FETS, is that the pn junction of the FETs make a surge circuit and prevent damage of the device. A resistor R21 operates to limit the amount of current flow, and diodes D11, D12 operate to limit the direction of the current flow and eliminate a surge. The diode D11 is connected to the electric power source Vcc, and the diode D12 is connected to the ground GND. When a signal with the voltage higher than Vcc is inputted, a current flows to the diode D11. As a result, the voltage higher than Vcc is not applied to the circuit of the post-stage. When a signal with the voltage lower than Vcc is inputted, a current flows to the diode D12. As a result, the voltage lower than GND is not applied to the circuit of the post-stage. A low-pass filter comprising resistors R31 to R3n and capacitances C11 to C1n operate to eliminate a high frequency surge and noise. The surge can be eliminated also in FET switches S11 to S1n. Therefore, it may be not necessay to provide the low-pass filter. The low-pass filter may be provided outside the pre-stage of the input terminal, without including in the multiplexer. Resistors R41 to R4n and FET switches S41 to S4n constitute a circuit for parting a voltage between Vcc and GND. This partial voltage circuit is used for an off-set voltage of a Schmidt circuit and an amplifier of the post-stage. AMP1 designates a non-inversion amplifier with the amplification degree of one time or buffer circuit to prevent the change of the voltage parted by the post-stage circuit. Resistors R51 to R5n and R61 to R6n are used to determine the threshold value of a hysteresis if AMP2 is used as a Schmidt circuit, and they are used to determine the amplification degree if AMP2 is used as an amplifier. The threshold value of the inverse Schmidt circuit from a high-state to a low-state is calculated by the following equation:

(Vcc−Vofst)*(combined resistor of R51 to R5n)/{(combined resistor of R51 to R5n)+(combined resistor of R61 to R6n)}

The threshold value of the non-inverse Schmidt circuit from a high-state to a low-state is calculated by the following equation:

Vcc−Vofst)*{(combined resistor of R51 to R5n)+(combined resistor of R61 to R6n)}/(combined resistor of R61 to R6n)−GND The amplification degree of the inverse amplifier is calculated by the following equation:

−(combined resistor of R61 to R6n)/(combined resistor of R51 to R5n)

The amplification degree of the non-inverse amplifier is calculated by the following equation:

1+(combined resistor of R61 to R6n)/(combined resistor of R51 to R5n)

The FET switches S61 to S6n and S81 to S8n are ones to switch so that AMP2 can be used as an inverse or non-inverse Schmidt circuit, or an inverse or non-inverse amplifier.

Namely, an inverse schmidt circuit is formed when a binary digit "1" is inputted to the FET switches S61 to S6n and "0" is inputted to the FET switches S81 to S8n. A non-inverse Schmidt circuit is formed when a binary digit "0" is inputted to the FET switches S61 to S6n and S81 to S8n. An inverse amplifier is formed when a binary digit "0" is inputted to the FET switches S61 to S6n and "1" is inputted to the FET switches S81 to S8n. And a non-inverse amplifier is formed when a binary digit "1" is inputted to the FET switches S61 to S6n and S81 to S8n. Thereby, the matching circuit becomes available to a digital input and an analog input. It is noted that GND levels of some sensors are different from one of the vehicle control unit. A resistor R71 is one to pull down a current. A resistor R81 operates to limit the current which flows to the post-stage circuit. It will be appreciated that some electric parts can be abbreviated for some sensors. Further, a part of these circuit may be provided outside.

FIG. 8 is a block diagram showing an embodiment of a data conversion/input circuit 10 shown in FIG. 3. A sensor signal 1000 is inputted, which is matched to a latch circuit 1002 and a sample hold circuit 1003. If the sensor signal is a digital one, a latch signal is applied to the latch circuit 1002 and thereby the sensor signal is latched. Then, a serial/parallel conversion start signal 820 is supplied to a serial/parallel converting circuit 1004 and thereby the serial/parallel conversion is carried out therein. Its bit shift amount is determined by a data storage register selecting signal 817. After the completion of the conversion, the data is stored in a data register 1001 designated by the data storage register selecting signal 817. When an analog signal is inputted, the sample hold signal 819 is supplied to the sample hold circuit 1003 and thereby the analog signal is sample-latched. Then, an A/D conversion start signal 821 is supplied to an A/D converting circuit 1005 and an A/D conversion is performed. After the completion of the conversion, the data is stored in the data register 1001 designated by the data storage register selecting signal 821.

FIG. 9 is a block diagram showing another embodiment of the input control module 8, in which an input schedule table is used. An input signal schedule table 823 is provided in the memory 800. A sensor signal to be inputted and its order of input are stored in the schedule table 823, and the sensor signal is inputted in order for every input of a trigger signal 402. Information such as a input circuit mode, input enable time, etc. can be stored together in the schedule table 823. The trigger signal 402 can be generated by either an inside trigger and an outside trigger. If the trigger signal 402 with a constant length of time is generated in a trigger generating circuit 824 by a clock CK403, the sensor signal can be inputted continuously without using access of a processor. Thereby, the number of accesses of the processor is decreased and the responsibility of control becomes fast. An input start flag INSTF802 is set up by software or the trigger signal 402. When the flag INSTF802 is set up, necessary signals are outputted to necessary circuits in order to input a first input information signal 825. When the next trigger signal is inputted, necessary signals are outputted to necessary circuits in order to input a second input information signal 825. In a similar way, the input information signals are inputted in order for every input of a trigger signal. After the completion of the input of an n-th input information signal, the procedure is returned and the same procedure is repeated.

Referring to FIG. 10, an engine control system for a vehicle, which is applied to a 4-cylinder and 4-cycle engine will be explained hereinafter.

The following sensors can be provided at the engine. Namely, a TVO sensor 104 for detecting a throttle opening, an AFM sensor 105 for detecting an intake air flow mass, an $0_2$ sensor 108 for detecting an oxygen amount included in the exhaust gas, an REF sensor 103 for generating a pulse every time the crank angle of the engine 101 is 180 degrees, and a POS sensor 102 for generating a pulse every time the crank angle is 2 degrees. The width of a pulse signal of the REF sensor 103 is different for every cylinder. It is, therefore, possible to identify a cylinder by using the pulse information. As the mechanism to control the engine 101, there are provided an injector INJ106 for injecting a fuel and an ignition IGN107 for igniting the mixture of an air and the fuel. The injector INJ and the ignition IGN are provided on each of cylinders. A catalyst 109 acts to clean up emissions. The signals of digital input switches 110 such as an ignition switch, a start switch and an air conditioner switch, are inputted through the multiplexer 3 to the I/O LSI 14 including the programmable input signal matching module 5, in which these signals are processed by the processor or microcomputer 6. The resultant signal is used for controls.

FIG. 11 is a block diagram similar to that of FIG. 1, in which the I/O LSI 4 includes a plurality of programmable input signal matching modules 5. By providing a plurality of matching modules, it is possible to input a signal for each of the cylinders. It is effective to provide the same number of multiplexers as the matching modules or 1 to 12 multiplexers.

FIG. 12 is a block diagram showing another embodiment of the vehicle control unit 2, which has the I/O LSI 4 provided with both the multiplexer 3 including the surge withstand circuit and the programmable input signal matching module 5. Because the multiplexer 3 including the surge withstand circuit is included in the I/0 LSI 4 including the programmable input signal matching module 5, the number of the necessary ICs and wiring can be decreased and the reliability of the vehicle control unit is improved. In addition, it is possible to provide a vehicle control system which can operate at a high speed by making an LSI of the vehicle control unit.

What is claimed is:

1. A vehicle control system comprising:

a plurality of sensors for detecting conditions of the vehicle and for generating a plurality of sensor signals;

a vehicle control unit including a multiplexer, a programmable input signal matching module and a processor; and actuators for operating parts of the vehicle;

wherein said multiplexer and said matching module each include switches, and wherein said switches are set in accordance with selected ones of said sensor signals, wherein a plurality of said selected sensor signals are inputted through the multiplexer and matching module to said processor, and wherein said processor determines controls of vehicle operation on the basis of the inputted sensor signals and controls the actuators in accordance with the determined controls.

2. A vehicle control system according to claim 1, wherein said multiplexer is located outside said vehicle control unit.

3. A vehicle control system according to claim 1, wherein a surge withstand circuit is provided at an input part of said multiplexer.

4. A vehicle control system according to claim 1, wherein said processor is a microcomputer.

5. A vehicle control system comprising:

a plurality of sensors for detecting conditions of the vehicle and for generating a plurality of sensor signals;

a vehicle control unit including a programmable input signal matching module and a processor; and actuators for operating parts of the vehicle;

wherein said matching module includes switches that are set in accordance with selected ones of said sensor signals, wherein a plurality of said selected sensor signals are inputted through the matching module to said processor, and wherein said processor determines controls of vehicle operation on the basis of the inputted sensor signals and controls the actuators in accordance with the determined controls.

6. A vehicle control system according to claim 5, wherein said processor is a microcomputer.

7. A vehicle control apparatus comprising a vehicle control unit including a multiplexer and a programmable input signal matching module for inputting a plurality of sensor signals from sensors mounted on the vehicle, and further including a processor for determining controls of vehicle operation on the basis of the inputted sensor signals, wherein the multiplexer and said matching module each include switches that are set in accordance with selected ones of the sensor signals to be inputted, a plurality of sensor signals being inputted through the multiplexer and matching module to said processor.

8. A vehicle control method comprising the steps of:

providing a plurality of sensors to provide a plurality of sensor signals representative of vehicle operation parameters respectively used for a plurality of mutually distinct control operations;

selecting one of the plurality of sensor signals;

setting switches in a programmable input signal matching circuit in accordance with the selected sensor signal;

inputting the selected sensor signal through the matching circuit;

determining a control operation to be executed by a processor on the basis of the selected sensor signal; and controlling at least one of a plurality of actuators in accordance with the determined control operation.

9. A vehicle control system comprising:

a plurality of sensors for detecting conditions of a vehicle and generating sensor signals;

a plurality of actuators to respectively perform a control operation for a corresponding part of the vehicle; and a vehicle control unit including a multiplexer, a programmable input signal matching module and a processor;

said multiplexer and matching module each including switches which are set in accordance with a selected one of said sensor signals so that the selected sensor signal is inputted through the multiplexer and matching module to said processor, and said processor determining a control operation of vehicle operation on the basis of the selected sensor signal and controlling at least one of the actuators in accordance with the determined control operation.

10. A vehicle control system according to claim 9, wherein said multiplexer is located outside said vehicle control unit.

11. A vehicle control system according to claim 9, wherein a surge withstand circuit is provided at an input part of said multiplexer.

12. A vehicle control system according to claim 9, wherein said processor is a microcomputer.

13. A vehicle control system comprising:

a plurality of sensors for detecting conditions of a vehicle and generating sensor signals;

a plurality of actuators to respectively perform a control operation for a corresponding part of the vehicle; and a vehicle control unit including a programmable input signal matching module and a processor;

said matching module including switches which are set in accordance with a selected one of said sensor signals so that the selected sensor signal is inputted through the matching module to said processor, and said processor determining a control operation of vehicle operation on the basis of the inputted sensor signal and controlling at least one of the actuators in accordance with the determined control operation.

14. A vehicle control system according to claim 13, wherein said processor is a microcomputer.

* * * * *